(12) United States Patent
Ramaiah et al.

(10) Patent No.: US 9,593,961 B2
(45) Date of Patent: Mar. 14, 2017

(54) SYSTEM AND METHOD FOR INTEGRATED TIME BASED NOTIFICATION FOR IMPROVED SITUATIONAL AWARENESS

(71) Applicant: HONEYWELL INTERNATIONAL INC., Morristown, NJ (US)

(72) Inventors: Vinoda Ramaiah, Karnataka (IN); Kiran Gopala Krishna, Karnataka (IN); Dave Pepitone, Sun City West, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 153 days.

(21) Appl. No.: 14/458,596

(22) Filed: Aug. 13, 2014

(65) Prior Publication Data
US 2016/0047674 A1 Feb. 18, 2016

(51) Int. Cl.
*G08G 1/123* (2006.01)
*G01C 23/00* (2006.01)
*G08G 5/00* (2006.01)

(52) U.S. Cl.
CPC .......... *G01C 23/005* (2013.01); *G08G 5/0013* (2013.01); *G08G 5/0021* (2013.01); *G08G 5/0052* (2013.01)

(58) Field of Classification Search
CPC .................................................. G06F 3/04817
USPC ...................................... 340/995.27
See application file for complete search history.

(56) References Cited

U.S. PATENT DOCUMENTS

| 6,085,129 A | 7/2000 | Schardt et al. |
| 6,160,497 A | 12/2000 | Clark |
| 7,765,061 B1 | 7/2010 | Barber et al. |
| 8,099,201 B1* | 1/2012 | Barber .................. G01C 23/00 340/945 |
| 2008/0114504 A1* | 5/2008 | Goodman ............ G08G 5/0013 701/3 |
| 2010/0274417 A1 | 10/2010 | Perbet et al. |
| 2011/0010082 A1* | 1/2011 | Wilson ................... G01C 23/00 701/532 |
| 2012/0203448 A1 | 8/2012 | Pepitone et al. |
| 2012/0319872 A1 | 12/2012 | Gremmert et al. |
| 2013/0268878 A1 | 10/2013 | Le Roux et al. |
| 2014/0156115 A1 | 6/2014 | Aymeric et al. |

FOREIGN PATENT DOCUMENTS

FR 2987915 A1 9/2013

OTHER PUBLICATIONS

Extended EP Search Report for Application No. 15179758.6-1803 dated Jan. 19, 2016.

* cited by examiner

*Primary Examiner* — Omeed Alizada
(74) *Attorney, Agent, or Firm* — Lorenz & Kopf, LLP (57) ABSTRACT

A system and method for providing integrated time-based notification and aircraft status data on a display is provided. The system and method receives aircraft status data, pilot input data, data link notification data and aircraft notification data. The system and method generates and displays a timescale region divided into equal intervals from a predetermined origin with an icon graphically representative of a position of the aircraft overlaid with an icon graphically representative of notification data. The system and method continuously updates the temporal data as the aircraft flies, and responds to user requests to pan forward in time, pan backward in time and adjust the zoom on the timescale.

15 Claims, 9 Drawing Sheets

FIG. 17

SYSTEM AND METHOD FOR INTEGRATED TIME BASED NOTIFICATION FOR IMPROVED SITUATIONAL AWARENESS

TECHNICAL FIELD

The present invention relates generally to avionics display systems and, more particularly, to an avionics display system and method for providing integrated time-based notification.

BACKGROUND

Pilots are faced with two major tasks; i.e. (1) accurately determining and remaining constantly aware of the current aircraft status; and (2) making adjustments in response to changes in aircraft status. In support of this, avionics display systems have been extensively engineered to visually convey a considerable amount of flight information in an intuitive and readily comprehendible manner.

In conventional avionics display systems, much of the information is visually expressed on a cockpit display, (e.g., a primary flight display, a navigation display, a horizontal map display, a vertical situation display, etc.) The visually expressed information is instantaneous direct information about the space around the aircraft, such as nearby geographical features (e.g., mountain peaks, runways, etc.), current weather conditions (e.g. developing storm cells), and aircraft parameters (e.g., the heading, drift, roll, yaw and pitch of the host aircraft). The amount of visually expressed information increased with the introduction of flight management systems, a type of specialized computer that includes a database of pre-stored navigation landmarks such as airports and arbitrary intersections (referred to herein as waypoints) in the sky. The visual information that is presented to the pilot via a flight management system, or similar device, includes aircraft notifications or alerts that may be time sensitive.

In addition to visual aircraft notifications, pilots must comprehend aural aircraft notifications, such as alerts that typically chime on the occurrence of, but not before, an event. The introduction of required time of arrival (RTA), coupled with the increase in data link communication, such as Controller Pilot Data Link Communication (CPDLC), has increased the number of aircraft notification items a pilot has to remember and respond to at a future time. Currently, to perform time-constrained tasks, the pilot has to make his own notes and remember to perform the tasks at the appropriate time. Examples of time-constrained tasks include responding to air traffic control (ATC) instructions (that have a mandatory pilot response for a clearance to be executed in the future), pilot "report position [at time]" instructions, Notice to Airmen (NOTAM) activation expiry time, and XM weather expiry time (NOTAM and XM weather expiry time do not have mandatory pilot response, but the pilot should review them).

Pilots also strive to create a precise picture of future situations having time-based notifications using information that is currently available to them such as weather reports and forecasts, pilot reports, NOTAM, information about other air traffic, and the like. In order to create a precise picture of future situations, pilots traditionally have to synthesize temporal information from various sources; for example, information disseminated as NOTAMs, published activation of restricted airspaces, and/or weather information with an estimate of future predicted positions. The traditional approach is time-consuming and requires a significant amount of cognitive resources and memory allocation; e.g., one or more navigation mechanisms are supported by pull-down menus, toolbars, dialog boxes, etc. Thus, providing each piece of information individually without a broader context does not enhance the temporal or local aspects of the information provided.

In view of the foregoing, a system and method for providing integrated time-based notification is desirable. The desirable system and method generates and displays a timescale providing temporal notification data that may be integrated into an existing aircraft display system. It would further be desirable for the display to continuously update the temporal data as the aircraft flies, and to respond to user requests to pan forward in time, pan backward in time and adjust the zoom. In this manner, temporal information responsive to the flight process and the pilot input is integrated into the cockpit display, reducing workload, and increasing efficiency when making strategic decisions.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

A method for providing integrated time-based notification and aircraft status data on a display is provided. The system receives aircraft status data, notification data, and pilot input data. The method displays a timescale region divided into equal intervals from a predetermined origin with an icon graphically representative of a position of the aircraft overlaid with an icon graphically representative of the notification data.

An interactive display system is provided. The system includes a display, a first source of aircraft status data, a second source of pilot input data, a third source of aircraft notification data and a fourth source of data link notification data. A processor is coupled to the display, the first source, the second source, the third source, and the fourth source and configured to (a) generate a timescale region divided into equal intervals from a predetermined origin using the aircraft status data and pilot input data, and (2) display the timescale region with an icon graphically representative of a position of the aircraft overlaid with an icon graphically representative of the aircraft notification data.

Another method for providing integrated time based notification and aircraft status data on a display is provided. Aircraft status data associated with a flight plan, pilot input data, and notification data is received. A timescale region divided into equal intervals from a predetermined origin with an icon graphically representative of a position of the aircraft overlaid with an icon graphically representative of the notification data is displayed. Symbology associated with the notification is selected and detailed information associated with the selected notification is displayed.

BRIEF DESCRIPTION OF THE DRAWINGS

A more complete understanding of the subject matter may be derived by referring to the following Detailed Description and Claims when considered in conjunction with the following figures, wherein like reference numerals refer to similar elements throughout the figures, and wherein:

DETAILED DESCRIPTION

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

For the sake of brevity, conventional techniques related to graphics and image processing, sensors, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

The embodiment described herein is merely an example and serves as a guide for implementing the novel systems and method herein on any user interface in any industrial, commercial, or consumer avionics application. As such, the examples presented herein are intended as non-limiting.

Figure 1:
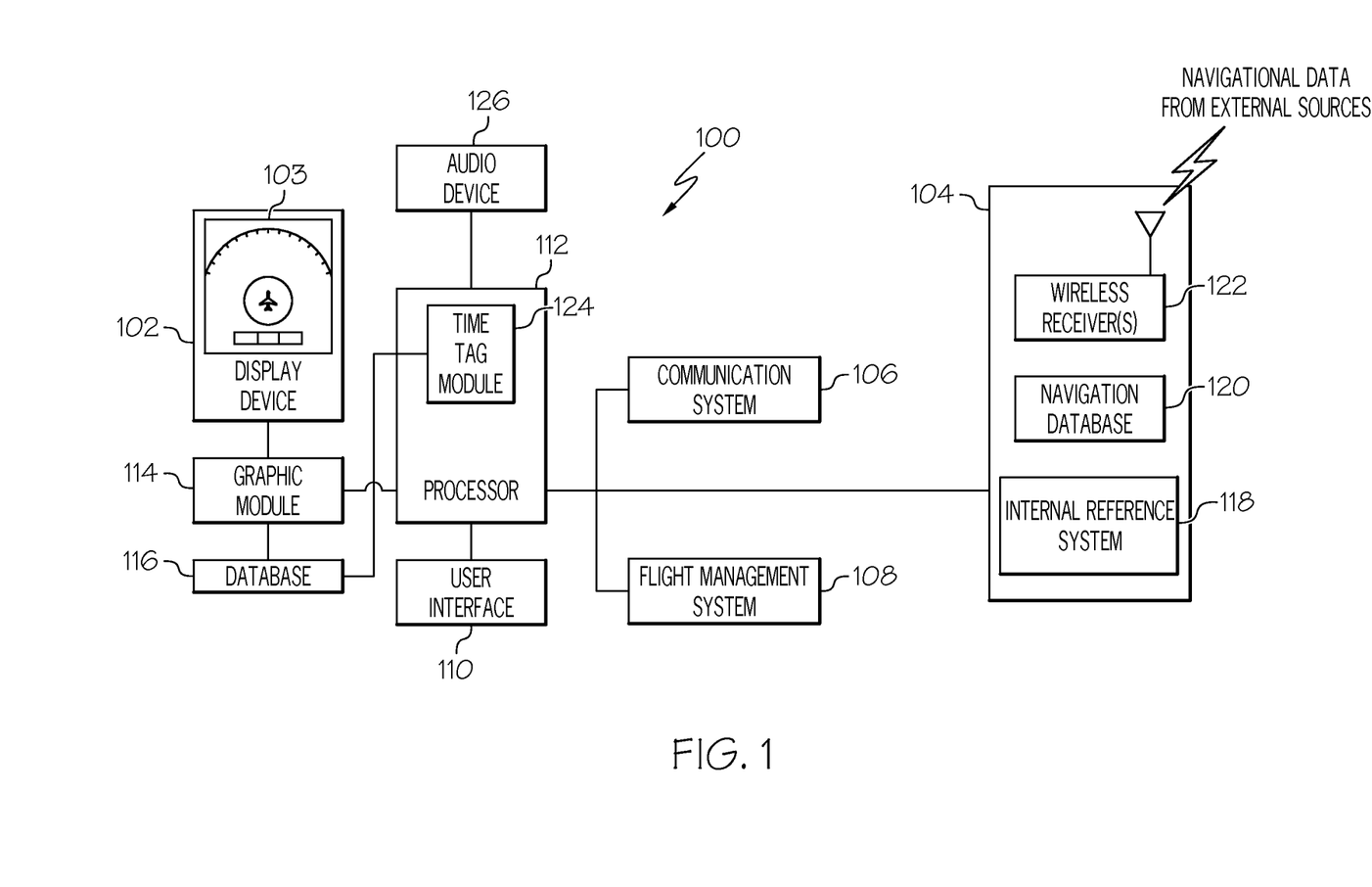
FIG. 1 is a block diagram of an information display system suitable for use in an aircraft in accordance with an embodiment.

FIG. 1 depicts an exemplary embodiment of an interactive display system 100, which may be located onboard a vehicle such as an aircraft. In an exemplary embodiment, the display system 100 includes, without limitation, a display device 102 for displaying a graphical flight plan image 103, a navigation system 104, a communications system 106, a flight management system (FMS) 108, a processor 112, an audio device 126, a graphics module 114, the user interface 110, and the database 116 suitably configured to support operation of the graphics module 114, a time tag module 124, and a display device 102, as described in greater detail below. The time tag module 124 is described in detail in connection with FIG. 2. Navigation system 104 may include an inertial reference system 118, a navigation database 120 and one or more wireless receivers 122 for receiving navigational data from external sources in the well-known manner.

It should be understood that FIG. 1 is a simplified representation of an interactive display system 100 for purposes of explanation and ease of description and is not intended to limit the application or scope of the subject matter in any way. In practice, the display system 100 and/or the aircraft will include numerous other devices and components for providing additional functions and features, as will be appreciated in the art. For example, the display system 100 and/or the aircraft may include one or more avionics systems (e.g., a weather system, an air traffic management system, a radar system, a traffic avoidance system) coupled to the flight management system 108 and/or the processor 112 for obtaining and/or providing real-time flight-related information that may be displayed on the display device 102. In the exemplary embodiment, the display device 102 is coupled to the graphics module 114. The graphics module 114, the processor 112, the display device 102, and database 116 are coupled and cooperatively configured to display, render, or otherwise convey one or more graphical representations or images such as a flight plan associated with operation of the aircraft on the display device 102.

Navigation system 104 typically provides most of the aircraft status data. In an exemplary embodiment, the navigation system 104 is configured to obtain one or more navigational parameters associated with operation of the aircraft. The navigation system 104 may be realized as a global positioning system (GPS), inertial reference system (IRS), or a radio-based navigation system (e.g., VHF Omni-directional radio range (VOR) or long range aid to navigation (LORAN)), and may include one or more navigational radios or other sensors suitably configured to support operation of the navigation system 104, as will be appreciated in the art. In an exemplary embodiment, the navigation system 104 is capable of obtaining and/or determining the instantaneous position of the aircraft, that is, the current location of the aircraft (e.g., the latitude and longitude) and the altitude or above ground level for the aircraft. The navigation system 104 may also obtain and/or determine the heading of the aircraft (i.e., the direction the aircraft is traveling in relative to some reference).

As stated previously, navigation system 104 includes an inertial reference system 118, a navigation database 120, and at least one wireless receiver 122. Inertial reference system 118 and wireless receiver 122 provide processor 112 with navigational information derived from sources onboard and external to the host aircraft, respectively. More specifically, inertial reference system 118 provides processor 112 with information describing various flight parameters of the host aircraft (e.g., position, orientation, velocity, etc.) as monitored by a number of motion sensors (e.g., accelerometers, gyroscopes, etc.) deployed onboard the aircraft.

By comparison, and as indicated in FIG. 1, wireless receiver 122 receives navigational information from various sources external to the aircraft. These sources may include various types of navigational aids (e.g., global position systems, non-directional radio beacons, very high frequency Omni-directional radio range devices (VORs), etc.), ground-based navigational facilities (e.g., Air Traffic Control Centers, Terminal Radar Approach Control Facilities, Flight Service Stations, and control towers), and ground-based guidance systems (e.g., instrument landing systems). In certain instances, wireless receiver 122 may also periodically receive Automatic Dependent Surveillance-Broadcast (ADS-B) data from neighboring aircraft. In a specific implementation, wireless receiver 122 assumes the form of a multi-mode receiver (MMR) having global navigational satellite system capabilities.

Navigation database 120 stores a considerable amount of information useful in flight planning. For example, navigation database 120 can contain information pertaining to the geographical location of waypoints and lists of available approaches, departures and arrivals that may be flown by an aircraft when landing at a particular runway. During flight planning, a pilot may utilize user interface 110 to designate a desired approach from a list of available approaches stored in navigational database 120. After the pilot designates the desired approach, processor 112 may then recall from navigational database 120 relevant information pertaining to the designated approach.

Processor 112 is coupled to navigation system 104 for obtaining real-time navigational data and/or information regarding operation of the aircraft to support operation of the display system 100. In an exemplary embodiment, the communications system 106 is coupled to the processor 112 and configured to support communications to and/or from the aircraft, as is appreciated in the art. The processor 112 is also coupled to the flight management system 108, which in turn, may also be coupled to the navigation system 104 and the communications system 106 for providing real-time data and/or information regarding operation of the aircraft to the processor 112 to support operation of the aircraft. In an exemplary embodiment, the user interface 110 (e.g. touchscreen or cursor control) is coupled to the processor 112, and the user interface 110 and processor 112 are cooperatively configured to allow a user to interact with display device 102 and other elements of display system 100, as described in greater detail below.

In an exemplary embodiment, the interactive display device 102 is realized as an electronic display configured to graphically display flight information or other data associated with operation of the aircraft under control of the graphics module 114. In an exemplary embodiment, the display device 102 is located within a cockpit of the aircraft. It will be appreciated that although FIG. 1 shows a single display device 102, in practice, additional display devices may be present onboard the aircraft.

The user interface 110 may also be located within the cockpit of the aircraft and adapted to allow a user (e.g., pilot, co-pilot, or crew member) to interact with the remainder of display system 100 and enables a user to indicate, select, or otherwise manipulate content displayed on the display device 102, as described in greater detail below. In various embodiments, the user interface 110 may be realized as a keypad, touchpad, keyboard, cursor control, touchscreen, joystick, knob, microphone, or another suitable device adapted to receive input from a user. In preferred embodiments, user interface 110 may be a touchscreen, cursor control device, joystick, or the like.

In an exemplary embodiment, the communications system 106 is suitably configured to support communications between the aircraft and another aircraft or ground location (e.g., air traffic control). In this regard, the communications system 106 may be realized using a radio communication system or another suitable data link system. In an exemplary embodiment, the flight management system 108 (or, alternatively, a flight management computer) is located onboard the aircraft. Although FIG. 1 is a simplified representation of display system 100, in practice, the flight management system 108 may be coupled to one or more additional modules or components as necessary to support navigation, flight planning, and other aircraft control functions in a conventional manner.

The graphics module 114 generally represents the hardware, software, and/or firmware components configured to control the display and/or rendering of a navigational map on the display device 102 and perform additional tasks and/or functions described in greater detail below. In an exemplary embodiment, the graphics module 114 accesses one or more databases 116 suitably configured to support operations of the graphics module 114, as described below. With regard to the graphic module 114, the database 116 may comprise a terrain database, a weather database, a flight plan database, an obstacle database, a navigational database, a geopolitical database, a terminal airspace database, a special use airspace database, notification databases, or other information for rendering and/or displaying content on the display device 102, as described below. It will be appreciated that although FIG. 1 shows a single database 116 for purposes of explanation and ease of description, in practice, numerous databases will likely be present in a practical embodiment of the display system 100.

Audio device 126 may be one or more devices suitable for converting audio data into aural information in the form of warnings, directions, sounds or verbal information. The audio device 126 responds to audio commands by converting audio data into aural information. Example audio devices include radios, intercoms, sirens and horns.

The processor 112 generally represents the hardware, software, and/or firmware components configured to facilitate the display and/or rendering of a navigational map on the display device 102 and perform additional tasks and/or functions described in greater detail below. Depending on the embodiment, the processor 112 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The processor 112 may also be implemented as a combination of computing devices, e.g., a combination of a digital signal processor and a microprocessor, a plurality of microprocessors, one or more microprocessors in conjunction with a digital signal processor core, or any other such configuration. In practice, the processor 112 includes processing logic that may be configured to carry out the functions, techniques, and processing tasks associated with the operation of the display system 100, as described in greater detail below. Furthermore, the steps of a method or algorithm described in connection with the embodiments disclosed herein may be embodied directly in hardware, in firmware, in a software module executed by the processor 112, or in any practical combination thereof.

The processor 112 may include or cooperate with an appropriate amount of memory (not shown), which can be realized as RAM memory, flash memory, EPROM memory, EEPROM memory, registers, a hard disk, a removable disk, a CD-ROM, or any other form of storage medium known in the art. In this regard, the memory can be coupled to the processor 112 such that the processor 112 can read information from, and write information to, the memory. In the alternative, the memory may be integral to the processor 112. In practice, a functional or logical module/component of the system described here might be realized using program code that is maintained in the memory. Moreover, the memory can be used to store data utilized to support the operation of the system, as will become apparent from the following description.

Figure 2:
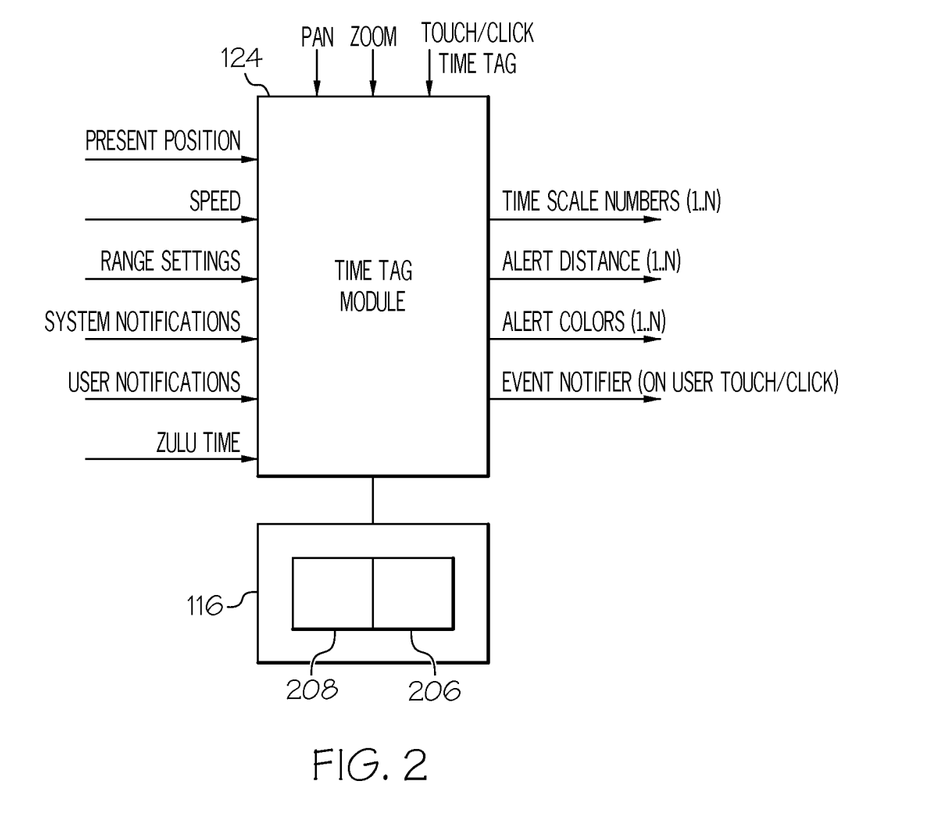
FIG. 2 is a block diagram of the time tag module shown in FIG. 1, in accordance with an embodiment.

FIG. 2 is a block diagram of the time tag module 124 shown in FIG. 1, in accordance with an embodiment. Database 116 is depicted with two sub-databases: database 206 for storing an active notification list, and database 208 for storing an expired notification list; notification as used herein refers to temporal information from one or more sources. Notification is managed by the time tag module 124. Present and future notification is referred to as active notification, and a list of active notifications is stored in database 206. When the notification has expired (i.e., the aircraft notification is in the past with respect to the location of the aircraft), time tag module 124 moves the information associated with the expired aircraft notification to the expired notification list stored in database 208.

The time tag module 124 receives as input various aircraft status data (for example, present position, present speed, Zulu time, and a plurality of system notifications), user notifications, data link notifications, range settings, and pilot input via the user interface 110 (for example, pan left, pan right, touch/click input and zoom requests). In response to the various inputs, the time tag module 124 generates a timescale region divided into equal intervals of time measured from a predetermined origin (the predetermined origin being time zero), time scale numbers (1, n), associated alert distances (1, n), associated alert colors (1, n) and associated event/alert notifiers. The time tag module may also be configured to command the audio device 126 to generate aural alerts. Various other customizing features for the display are determined within the time tag module 124, for example, colors and visually distinguishing techniques used for alerts associated with notifications, the icon or symbol used for the alerts, and the location of the alert/icon on the timescale.

Figure 3:
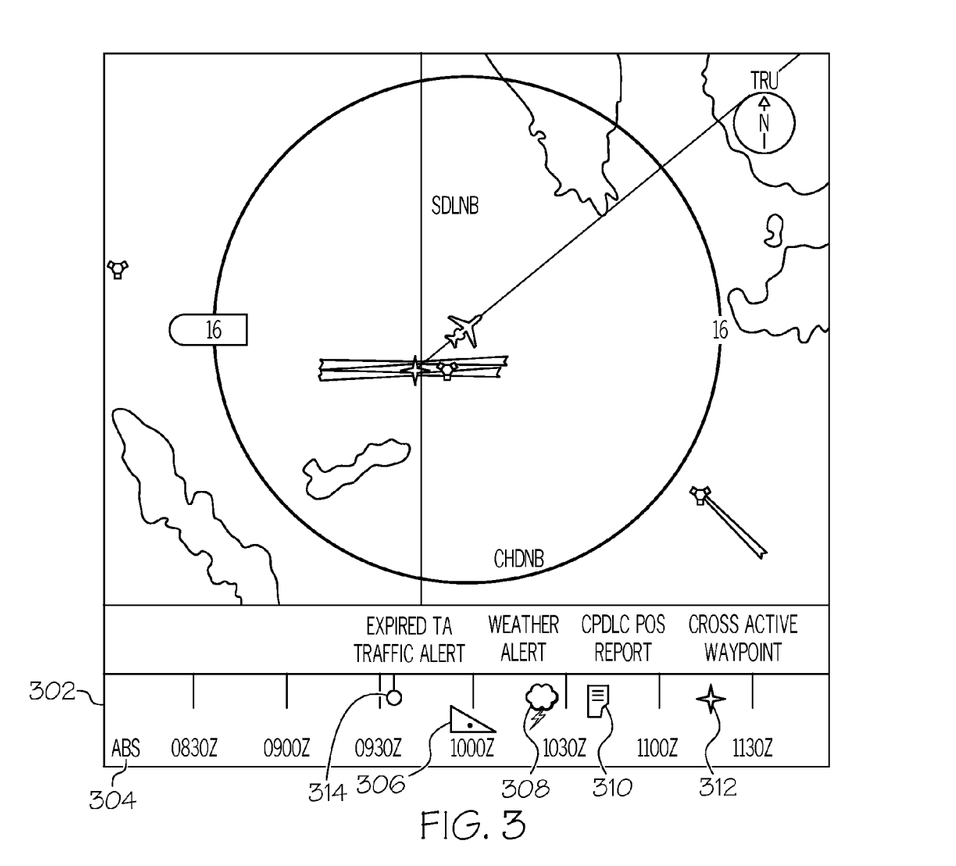
FIG. 3 illustrates a navigation display having a timescale incorporated therewith in accordance with an exemplary embodiment.

FIG. 3 illustrates a navigation display 300 having a timescale 302 incorporated into a lateral map in accordance with an exemplary embodiment. Timescale 302 is shown with the predetermined origin set to zero Zulu time, or absolute time, as indicated with "abs" 304. Symbology, generally in the form of predetermined icons, graphically represents the aircraft location 306 and the notifications. In the exemplary embodiment, icons graphically depicting notifications such as a weather alert 308, a CPDLC POS report (controller pilot data link position report) 310, and an active waypoint 312, are overlaid on the timescale 302. Non limiting examples of other notifications that may be displayed with unique icon/alert symbols include fuel alerts, checklist alerts, NAVAID or waypoint alerts, and radio frequency alerts.

The time tag module 124 continually manages notifications, converts notification data between geographic distances and time relative to the aircraft position and location, and determines when/where to display the notification on the timescale. The location of a notification icon/alert on the displayed timescale is determined by time tag module 124, and represents a temporal relationship referred to herein as "delta time" between the aircraft and the associated notification, in combination with any pilot notification preferences (such as an alert threshold) that may have been set. Time tag module 124 may overlay CPDLC notifications and messages on the timescale such that they correspond to the time at which they were received from ATC. In addition, the pilot may specify a predetermined threshold alert time (for example, fifteen minutes); when the predetermined threshold alert time is set, any notification or message received within that threshold alert time will automatically pop up on the timescale.

Time tag module 124 may also be configured by the pilot to generate aural alerts for any or all of the notifications. Aural alerts may be set for a specified (absolute) time or a time difference (relative time) with respect to the aircraft location.

When a notification is expired, time tag module 124 may change the notification icon to a predetermined expired aircraft notification icon, as shown at expired Traffic Alert TA 314, and may store the expired notification data in a database 208. In addition to using icons to depict various notifications, colors may be used to distinguish the proximity or priority of a notification and/or the icon may flash or otherwise be displayed in a visually distinguishable manner. The technique used to make the alert visually distinguishable may continue, for example, until the pilot acknowledges the alert, until a predetermined threshold time has passed, or until the alert/notification is expired.

Figure 4:
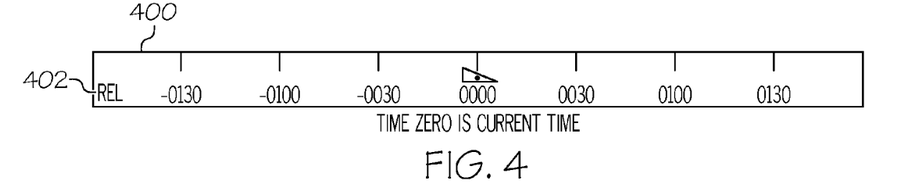
FIG. 4 depicts a timescale in which time zero is current time, in accordance with an exemplary embodiment.

FIGS. 4 through 7 depict timescale regions with various selections for the predetermined origin, or time zero that are supported by the exemplary embodiment. The pilot or crew may change the predetermined origin, or time zero, selection via the user interface 110. In each example, the timescale presents a range of time to the left and to the right of the aircraft. Time to the left of the aircraft is time that has passed, and time to the right of the aircraft is future time. Time tag module 124 continuously updates the display of the timescale as time passes and as the aircraft flies, which slews the display to the left. FIG. 4 depicts a timescale 400 in which the predetermined origin is a time zero set to current time, in accordance with an exemplary embodiment. In this embodiment, current time is indicated with the text "rel" 402.

Figure 5:
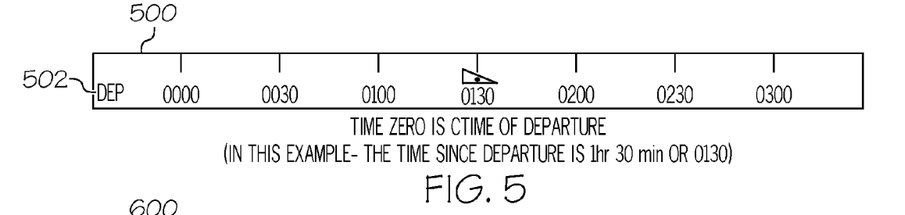
FIG. 5 depicts a timescale in which time zero is the time of departure, in accordance with an exemplary embodiment.

FIG. 5 depicts a timescale 500 in which the predetermined origin or time zero is the time of departure, in accordance with an exemplary embodiment. In this embodiment, departure time is indicated with the text "dep" 502.

Figure 6:
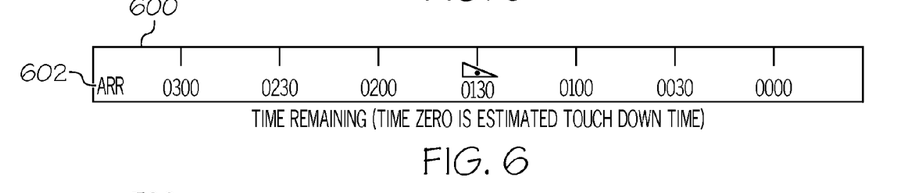
FIG. 6 depicts a timescale in which time zero is the arrival time (time remaining), in accordance with an exemplary embodiment.

FIG. 6 depicts a timescale 600 in which the predetermined origin or time zero is the arrival time, in accordance with an exemplary embodiment. In this embodiment, time to arrival (time remaining) is indicated with the text "an" 602.

Figure 7:
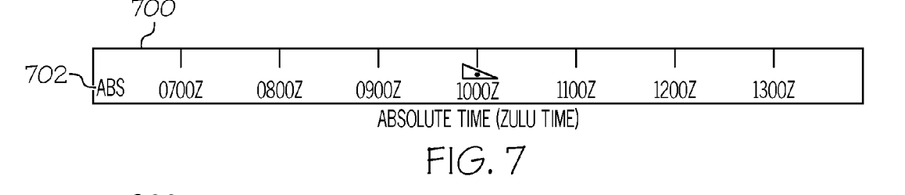
FIG. 7 depicts a timescale in which time is displayed as Zulu time, in accordance with an exemplary embodiment.

FIG. 7 depicts a timescale 700 having a predetermined origin that is Zulu time, in accordance with an exemplary embodiment. Zulu time is the absolute time measured from meridian zero. In this embodiment, Zulu time is indicated with the text "abs" 702.

Figure 8:
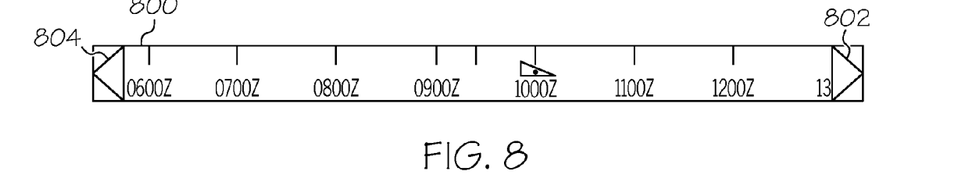
FIG. 8 depicts a timescale having handles for panning the timescale left or right, in accordance with an exemplary embodiment.

FIG. 8 depicts a timescale 800 having handles for panning the timescale left or right, in accordance with an exemplary embodiment. A symbol 802 serves as a graphical handle to pan in a first direction for displaying future time, and symbol 804 serves as a graphical handle to pan in a second, substantially opposite direction for displaying time past. In the exemplary embodiment, dragging the handle left initiates a pan left and dragging the handle right initiates a pan right. After a pan left or a pan right, notifications that may have expired (in the case of pan left) or that are farther into the future (in the case of a pan right) may be displayed. Dragging may be accomplished on a touch screen with a finger or by manipulation of a cursor or other user input device.

Figure 9:
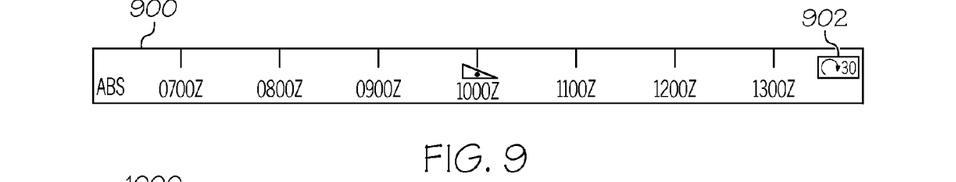
FIG. 9 depicts a timescale providing an option to change the zoom setting to increments of thirty minutes, in accordance with an exemplary embodiment.
Figure 10:
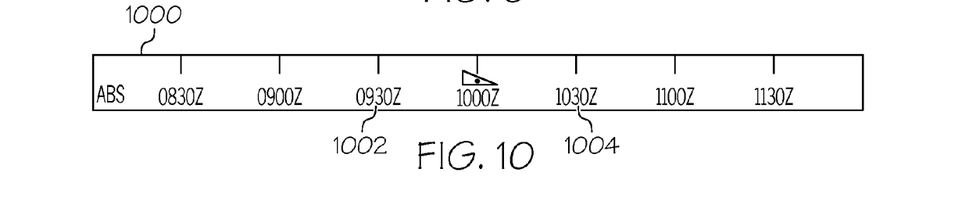
FIG. 10 depicts the timescale of FIG. 9 in response to selection of the thirty minute increment zoom setting, in accordance with an exemplary embodiment.

FIGS. 9 and 10 depict adding thirty minute increments in a zoom setting. FIG. 9 depicts a timescale 900 providing an optional zoom setting for adding increments of thirty minutes to the display, in accordance with an exemplary embodiment. Text and symbology 902 depict a thirty minute zoom setting. FIG. 10 depicts the timescale 1000 after the thirty minute zoom setting has been selected, in accordance with an exemplary embodiment. Time increment 1002 and time increment 1004 indicate thirty minute intervals.

Figure 11:
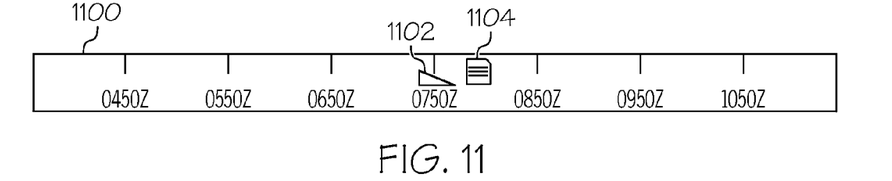
FIG. 11 depicts a timescale having a time tag in the future for the aircraft, in accordance with an exemplary embodiment.
Figure 12:
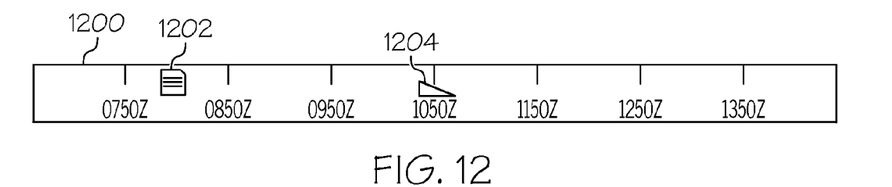
FIG. 12 depicts the timescale of FIG. 11 after the time tag is expired, in accordance with an exemplary embodiment.

FIGS. 11 and 12 depict the continual updating and slewing leftward of a timescale. FIG. 11 depicts timescale 1100 having a time tag 1104 in the future for the aircraft 1102, in accordance with an exemplary embodiment. FIG. 12 depicts the timescale of FIG. 11 after some time has elapsed and the aircraft 1204 has flown. In FIG. 12 the time tag 1202 is expired, in accordance with an exemplary embodiment. In response to the passage of time and the flight of the aircraft, the display system 100 slews the timescale leftward. The icon/alert associated with time tag 1202 may change color when the corresponding alert is expired, and in some embodiments, the symbol/icon itself may change to a predetermined expired notification symbol/icon.

Figure 13:
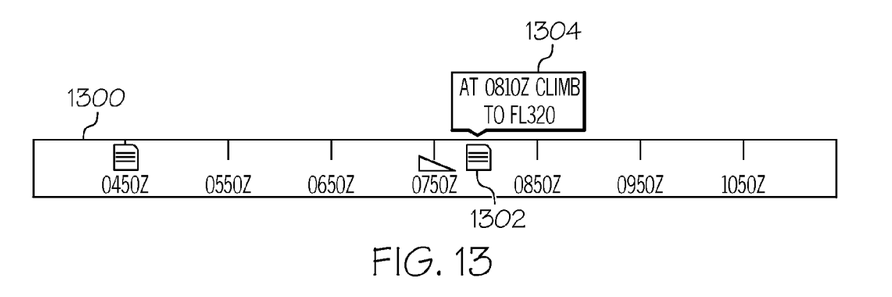
FIG. 13 depicts a timescale having a time tag that has been selected to provide additional information, in accordance with an exemplary embodiment.

FIG. 13 depicts a timescale 1300 having an icon associated with time tag 1302 that has been selected by a user to provide additional information, in accordance with an exemplary embodiment. Typically, the time tags are interactive; therefore a user can select a time tag for more information. Selecting may be accomplished on a touch screen with a finger or by manipulation of a cursor or other user input device. In FIG. 13, time tag 1302 has been selected, as indicated by a visually distinguishable change in the display of the icon (in comparison to FIG. 11, for example), and additional notification information is provided in a note 1304 associated with time tag 1302.

Some of the CPDLC messages received from Air Traffic Control (ATC) require crew action at a specified time. To alert crew of a need for action at a specific time, time tag module 124 may automatically generate a pop up message with an icon and display it on the timescale. Messages and icons may pop up on the screen in response to threshold alert times, too. As described in connection with FIG. 3, the pilot may specify a predetermined threshold alert time (for example, fifteen minutes); when the predetermined threshold alert time is set, the time tag module 124 will automatically pop up on the timescale an icon and associated notification or message received within that threshold alert time.

The time tag module 124 may employ various techniques that are pilot configurable to make a pop up icon and message visually distinguishable; as an example, 1) holding the icon and/or message for a minute, 2) flashing the icon and/or message, 3) closing the icon and/or message, and 4) repeating steps 1 through 3 until the pilot acknowledges the notification.

Figure 14:
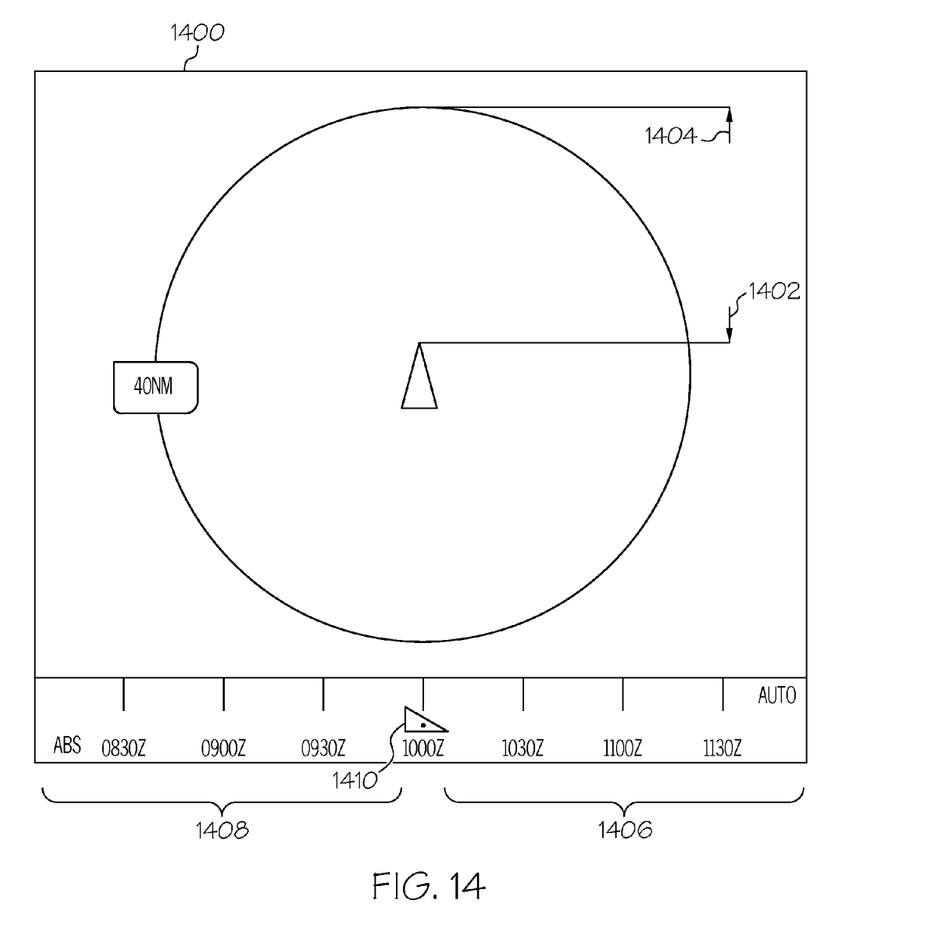
FIG. 14 depicts determination of a timescale based on an auto zoom feature in accordance with an exemplary embodiment.

FIG. 14 depicts determination of a timescale 1400 based on an auto zoom feature in accordance with an exemplary embodiment. When a timescale zoom setting is set to AUTO, the timescale zoom level syncs with the Outer Range Scale Setting on the Navigation display. Navigation display 1400 is shown having Outer Range Scale Setting 1404 of forty nautical miles (NM). The time tag module 124 determines the time required for the aircraft located at 1402 to reach the edge of the Outer Range Scale Setting 1404, modifies time scale 1400 with a range to the right 1406 and to the left 1408 of the aircraft icon 1410 that reflects the determination, and displays modified timescale 1400. In another exemplary embodiment, the zoom feature may be linked to a vertical situation display (VSD) range if the navigational map and the VSD are independent.

Figure 15:
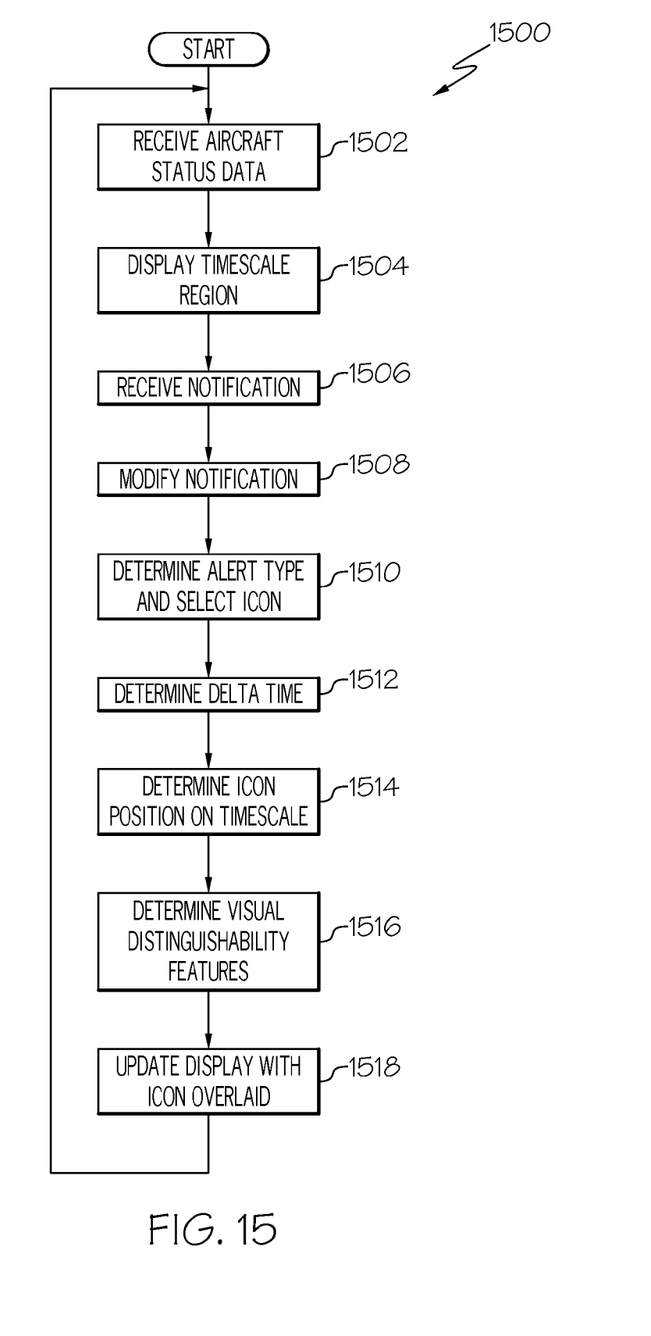
FIG. 15 is a flow chart that illustrates an exemplary embodiment of a time tag notification process.

FIG. 15 is a flow chart that illustrates an exemplary embodiment of a time tag notification process 1500. The steps that are depicted in FIG. 15 are for illustration purposes; not all steps are required, some embodiments may have additional steps, and some embodiments may arrange the steps in a different order.

Aircraft status data is received at STEP 1502. Non-limiting examples of aircraft status data include present position, speed, and range settings. Zulu time is also received in STEP 1502. At STEP 1504, process 1500 displays a time scale. The entire displayed time scale region is inclusive of a region of time in the future of the aircraft (to the right of the aircraft on the time scale) and a region of time that has passed behind the aircraft (to the left of the aircraft on the time scale). Pilot input data regarding a predetermined origin or time zero, zoom, and other time scale preferences is reflected in the time scale region displayed at STEP 1504. At STEP 1506, a notification is received. The notification may be a system notification, a user notification or a data link notification data. System notifications may comprise a block of data that includes position information and detailed textual content for a message. In contrast, user notifications may require additional steps of prompting the user to provide text content for an associated message and position/location information for the associated notification. Regardless of the notification type, the notification may be modified at STEP 1508 to accommodate pilot input. In STEP 1510 an alert type is determined for the notification. Alert types include air traffic control, weather, traffic, NOTAM, and the like. After the alert type is determined, a symbol or icon is determined according to the alert type at STEP 1510.

At STEP 1512, the delta time is determined. Delta time is determined based on aircraft status data such as position, direction, and speed, and represents the time between the present aircraft position and the notification. In some embodiments, the time tag module 124 may convert distance information into delta time. Delta time may be calculated via two methods. The first method utilizes the time of notification received from the notification message itself (for example, "ATC requests Report Position at 1400Z") and subtracts the current time. The second method utilizes position/location (latitude, longitude) information from the notification message and current aircraft speed to predict the time required to reach the position/location indicated. The calculated time is subtracted from the current time to obtain the delta time (for example, "Report Position at DAISY," where DAISY is a waypoint or a NAVAID determined by its latitude and longitude). At STEP 1514, time tag module 124 converts notification data between geographic distances and time relative to the aircraft position and location, to determine the notification icon/alert position on the timescale.

In STEP 1516, visually distinguishing characteristics for the icon/alert, such as color, flashing, highlight, or the like, are determined. Visual distinguishability techniques add information to a given notification. For example, an alert threshold of a first predetermined time may be set and notifications within an alert threshold may be visually distinguished from notifications outside of the alert threshold; icons selected by the user to obtain more detail may be visually distinguished from unselected icons; expired icons may be visually distinguishable from active icons; and icons requiring instant attention from the pilot may be visually distinguishable from less urgent icons. Icons that flash or pop up may continue to do so until the pilot acknowledges them, or they may time out on their own. Pilot input data, via the user interface 110, may be used to configure various visual distinguishability techniques.

The timescale display is updated with the icon overlaid on the time scale in STEP 1518. Along with updating the timescale in STEP 1518, a block of data that includes, but is not limited to, notification data, alert type, icon, delta time, icon position on the time scale, visually distinguishable characteristics of the icon, and the like, is stored in a database. If the notification is still in the future, the associated block of data is stored in an active notification list in database 206. If the notification is in the past, the associated block of data is stored in the expired notification list in database 208.

As mentioned hereinabove, the symbols or icons used for various alerts may be predetermined; they may also be changed in response to pilot input, which may be received at any time. STEPS 1502 to through 1518 may continuously cycle. The exemplary embodiment is capable of receiving more than one notification and performing the associated modification and determination steps in parallel for more than one notification. It is readily appreciated that, because of the independent nature of the notifications, multiple notifications may be observed to move along a time scale at different paces.

Figure 16:
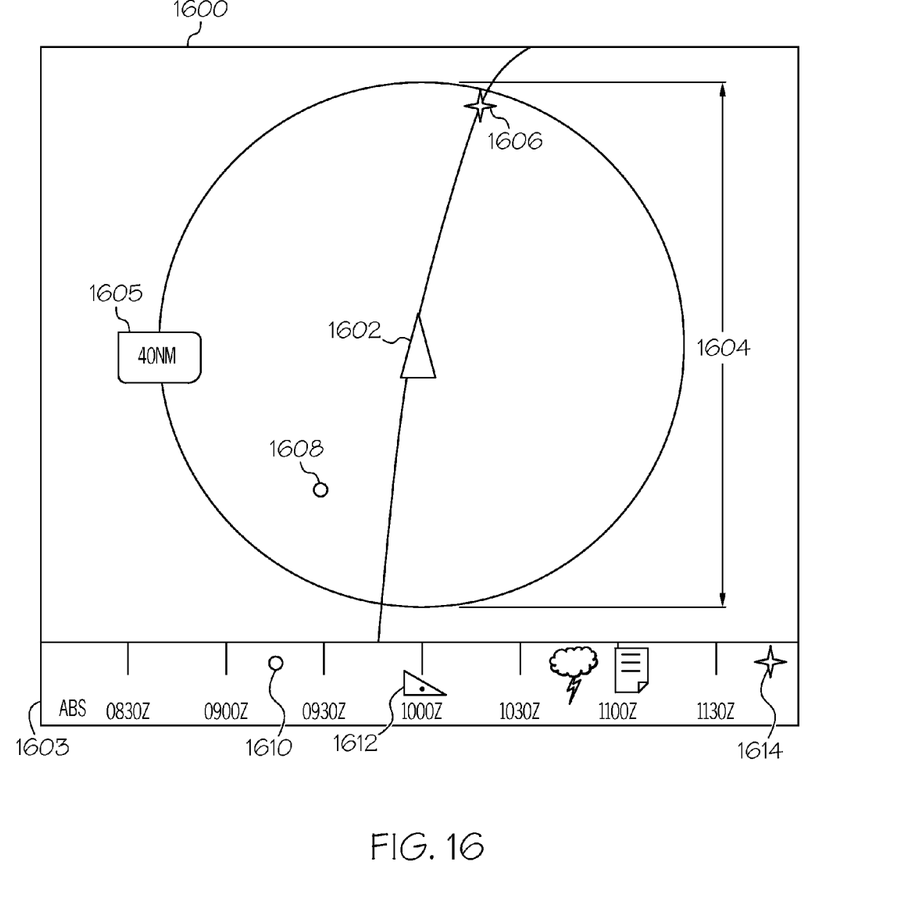
FIG. 16 illustrates a navigation display depicting the aircraft and some notifications, before a pan is executed, in accordance with an exemplary embodiment.

FIG. 16 illustrates a navigation display 1600 depicting the aircraft and some notifications, before a pan to show future time is executed, in accordance with an exemplary embodiment. Navigation display includes aircraft 1602 centered within a 40 nautical mile (NM) ring 1605. In the embodiment shown, the ring diameter 1604 determines the range depicted on the time scale 1603. Within the 40 NM ring, notification 1608 and notification 1606 are displayed. An icon 1610 graphically representative of the notification data 1608 is on time scale 1603, and icon 1614 graphically representative of notification 1606 is displayed. The aircraft 1602 is represented by icon 1612 on timescale 1603.

Figure 17:
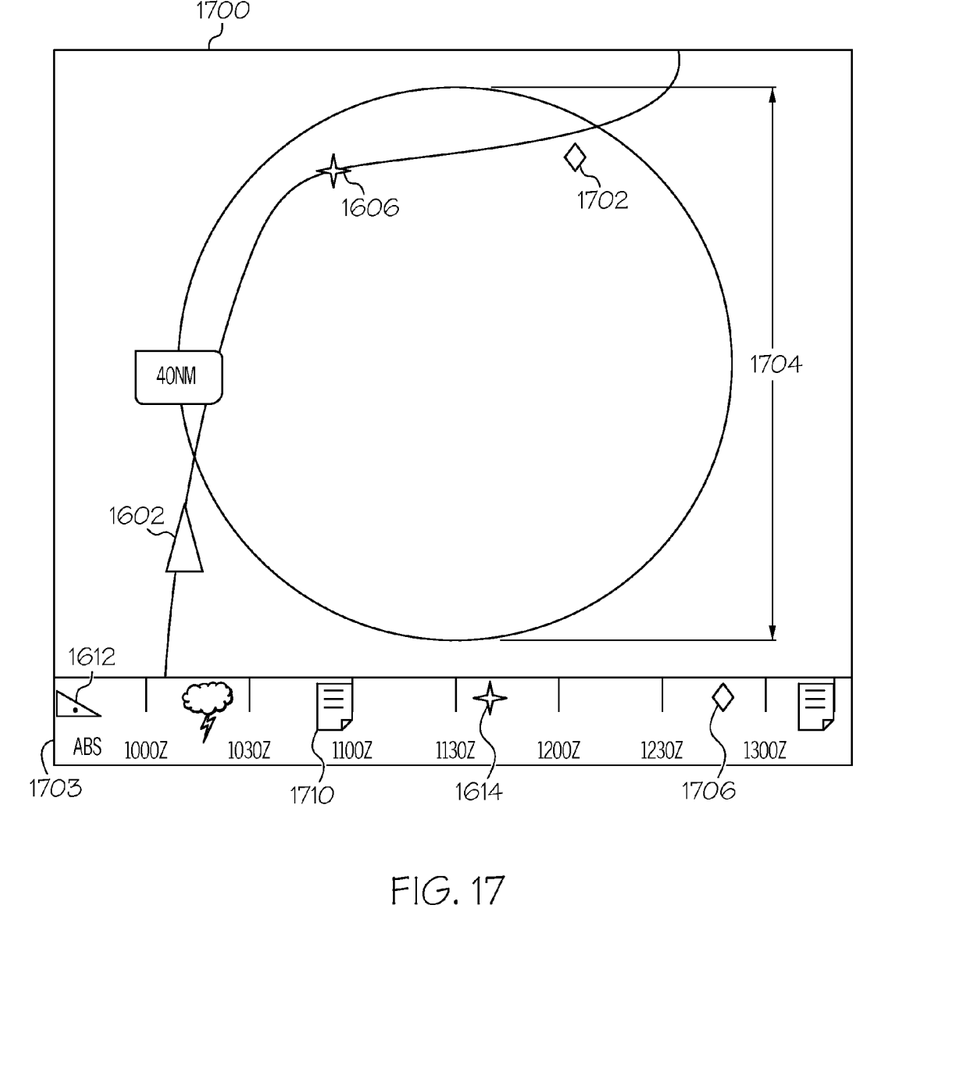
FIG. 17 illustrates the navigation display of FIG. 16 after a pan was executed, in accordance with an exemplary embodiment.

FIG. 17 illustrates the navigation display of FIG. 16 after the pan to future time was executed, in accordance with an exemplary embodiment. Navigation display 1700 illustrates the results of a (user initiated) pan to the future, resulting in the time scale appearing to slew left, and the navigation display appearing to slew left and down. In the exemplary embodiment, the panning direction, along with the defined flight path, is utilized to determine future/past time for display on the navigation display 1700 and time scale 1703. Aircraft 1602 is shown on the left side of navigation display 1700, outside of the 40 NM ring. Ring diameter 1704 remains the same as ring diameter 1604, and contains within it notification 1606 and a new notification 1702. The pan has resulted in notification 1608 disappearing from navigation display 1700 and time scale 1703. On timescale 1703, the numbers are adjusted to show the change to the panned position. Aircraft 1602 continues to be graphically represented by icon 1612, notification 1606 continues to be represented on the timescale as icon 1614, and the new notification 1702 is represented on the timescale 1703 by icon 1706. As described hereinabove, the timescale of the exemplary embodiment displays notifications from a plurality of sources, not all of which are displayed on the navigation display, for example, icon 1710.

Thus, there has been provided a system and method for providing integrated time-based notification and aircraft status data on a display. The system and method receives aircraft status data, pilot input data, and aircraft notification data. The system and method generates and displays a timescale region divided into equal intervals from a predetermined origin with an icon graphically representative of a position of the aircraft overlaid with an icon graphically representative of the aircraft notification data.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodi-

What is claimed is:

1. A method for displaying integrated time based notification and aircraft status data on a cockpit display, the method comprising:
   receiving aircraft status data associated with a flight plan;
   receiving pilot input data;
   receiving aircraft notification data; and
   displaying, coextensively on a lateral map with a ring diameter, a timescale region having a range determined by the ring diameter, the timescale region having a timescale divided into equal intervals from a predetermined origin;
   determining an alert type for the notification data;
   determining a unique alert symbol representative of the alert type for the notification data;
   overlaying, on the timescale and on the lateral map, (i) an icon graphically representative of the aircraft at its position and location, and (ii) the unique alert symbol type for the notification data, wherein the arrangement on the timescale of the aircraft icon and the unique alert symbol is time sensitive and representative of the temporal relationship between the aircraft location and the associated aircraft notification data.

2. The method of claim 1, wherein the notification data comprises aircraft notification data and data link notification data, and further comprising:
   receiving an outer range ring setting; and
   determining the time required for the aircraft to reach the edge of the outer range ring;
   modifying the timescale to comprise a range to the right and range to the left of the aircraft icon that reflects the determined time to reach an edge of the outer range ring; and
   displaying the modified timescale.

3. The method of claim 2, wherein the display is a touch screen, selecting is performed with a finger, and further comprising:
   receiving a user selection of a time tag, wherein a time tag comprises an icon associated with a notification; and
   displaying detailed information corresponding to the notification associated with the selected time tag.

4. The method of claim 1 further comprising sliding the timescale on the display in a first direction to view a future region, responsive to a user initiated pan to the future, and sliding the timescale on the display in a second, substantially opposite direction to view a previous region, responsive to a user initiated pan to the past.

5. The method of claim 4 wherein sliding is performed by dragging (i) a handle on the timescale, or (ii) a finger on a touchscreen.

6. The method of claim 1 further comprising:
   receiving an alert threshold of a first predetermined time; and
   visually distinguishing icons on the timescale associated with notification data determined to be within the first predetermined time from the aircraft from icons associated with notification data determined to be outside of the first predetermined time from the aircraft.

7. The method of claim 6 further comprising generating an aural alert when the notification data is determined to be within the first predetermined time from the aircraft.

8. The method of claim 1 further comprising visually altering an icon on the timescale when the associated notification data is expired.

9. The method of claim 1 further comprising selecting the predetermined origin from a group comprising (1) current time, (2) departure time, (3) Zulu time, and (4) arrival time.

10. An interactive display system, comprising:
    a display;
    a first source of aircraft status data;
    a second source of pilot input data;
    a third source of aircraft notification data;
    a fourth source of data link notification data; and
    a processor coupled to the display, the first source, the second source, the third source, and the fourth source, and configured to (1) generate a timescale divided into equal intervals from a predetermined origin using the aircraft status data and pilot input data, and (2) display, coextensively on a lateral map with a ring diameter, a timescale region having a range determined by the ring diameter, the timescale region and the lateral map each being overlaid with (a) an icon graphically representative of the aircraft and (b) a unique alert symbol graphically representative of an alert type determined for the aircraft notification data, wherein the arrangement on the timescale of the aircraft icon and the unique alert symbol is time sensitive and representative of the temporal relationship between the aircraft location and the associated aircraft notification data.

11. The system of claim 10 wherein the processor is further configured to display an icon graphically representative of the data link notification data.

12. The system of claim 11 wherein the processor is further configured to:
    receive an alert threshold of a first predetermined time; and
    visually distinguish icons and symbols associated with notification data determined to be within the first predetermined time from the aircraft from icons associated with notification data determined to be outside of the predetermined time from the aircraft.

13. The system of claim 12 wherein the processor is further configured to generate an aural alert when the notification data is determined to be within the first predetermined time from the aircraft.

14. The system of claim 11 wherein the processor is further configured to visually alter an icon on the timescale when the associated notification data is expired.

15. The system of claim 10 wherein the processor is further configured to select a predetermined origin from a group comprising (1) current time, (2) departure time, (3) Zulu time, and (4) arrival time.

* * * * *